Aug. 13, 1963  R. C. MILDNER  3,100,812
COAXIAL CABLE AND TEMPORARY TENSILE MEMBER THEREFOR
Filed Sept. 5, 1961

INVENTOR
RAYMOND CHARLES MILDNER

BY
ATTORNEY

United States Patent Office 3,100,812
Patented Aug. 13, 1963

3,100,812
COAXIAL CABLE AND TEMPORARY TENSILE
MEMBER THEREFOR
Raymond C. Mildner, 3703 Hillgrove Court,
Midland, Mich.
Filed Sept. 5, 1961, Ser. No. 135,950
8 Claims. (Cl. 174—10)

This invention relates to coaxial cables capable of transmitting frequencies of about 100 kilocycles per second and higher.

Where coaxial cables operate over wide temperature ranges, either due to climatic conditions, or due to heat losses associated with the transmission of large amounts of radio-frequency energy, the thermal expansion of the conductors of which the cable is composed can cause difficulties. In order that the transmission efficiency of the cable should be as high as possible, it is important that as little as possible solid material should be used in the insulating structure which supports the inner conductor. However, this condition aggravates the difficulties caused by the thermal expansion of the conductors.

Where the coaxial cable undergoes thermal expansion, and where mechanical coupling between the two conductors prevents differential expansion, crushing forces are imposed on the insulating structure at designed bends in the cable run, and at points where there is random lack of straightness. Any residual differential thermal expansion causes relative movement of the two conductors, and this movement causes wear and the production of metallic dust. Furthermore, at very high frequencies the relative movement of the conductors leads to difficulties in maintaining good electrical matching at the terminations of the cable.

For these reasons it is highly desirable to limit the relative movement of the two conductors to the greatest possible extent. The expansion of the outer conductor will generally be determined by the environment in which it is placed. Thus, a cable clamped to a mast will tend to be constrained to the expansion of the mast itself. It is desirable that the outer conductor should be thin walled so as to avoid excessive strain of the cable clamps. In the case of large cables, the outer conductor should also preferably be corrugated, both for the above reason and to allow the cable to be reeled on to drums of reasonable diameter without excessive deformation by kinking or flattening.

To limit the crushing forces on the insulating structure, it is desirable that the longitudinal compressive forces which are necessary to overcome the free thermal expansion of the inner conductor, should be as small as possible. A practical method of achieving this is to make the inner conductor also as a thin-walled tube, and to form the cylindrical surface with helical corrugations, preferably with a very short pitch.

Such a cable, when installed, meets the operating requirements very satisfactorily, but none of the cable components has sufficient longitudinal strength to enable it to be manufactured easily with the required precision or to be installed readily up very high masts. It is an object of this invention to avoid these difficulties.

According to the present invention there is provided in the manufacture of a coaxial cable having a hollow inner conductor, the method step of inserting inside the hollow inner conductor of the coaxial cable a tensile element of substantial strength, and means for temporarily locking the said element to the inner surface of the inner conductor, the arrangement being such that the tensile element can be temporarily locked to the inner conductor to provide the cable with sufficient longitudinal strength to simplify manufacture and installation of the cable, and such that, when the cable has been installed, said means may be unlocked to permit the tensile element and said means to be removed.

When the cable is finally clamped in position the tensile element is released from locking engagement with the inner surface of the inner conductor, and is withdrawn from the cable.

The tensile element may be locked to the inner surface of the inner conductor by means of an inflatable locking mechanism, or by a form of a ratchet mechanism so that the locking mechanism is effective for tensile pulls in one direction, but ineffective for pulls in the other direction. Such a mechanism may comprise providing the tensile element with sprung projections lying at an angle to the axis of the tensile element. The tensile element and the locking mechanism are so arranged that the stresses arising during the manufacture and installation of the cable are in a direction in which the locking mechanism is effective, and the element may be withdrawn by pulling in the direction in which the locking mechanism is ineffective.

In order to enable the invention to be more readily understood, reference will now be made to the accompanying drawings which illustrate diagrammatically and by way of example an embodiment thereof and in which.

Figure 1:
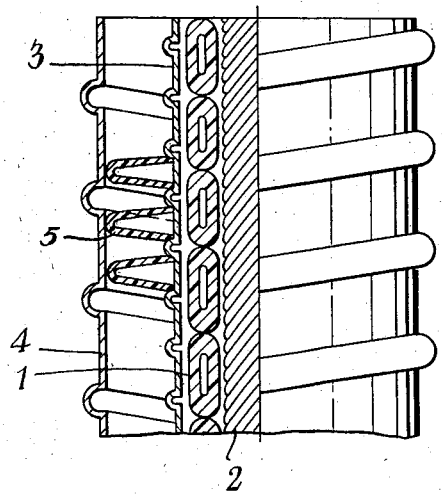
FIG. 1 shows in part longitudinal section part of a coaxial cable.
Figure 2:
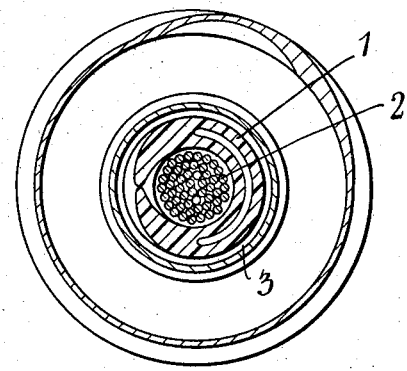
FIG. 2 is a cross sectional view of the cable shown in FIG. 1.

Referring now to the drawings, a flattened tube 1 of rubber or synthetic plastic material is wrapped helically around a steel rope 2 of the kind in which the individual strands are so selected as to cross-section and pitch that the complete rope is approximately balanced as regards torsional strain when tension is applied to it.

The assembly of tube 1 and rope 2 has a diameter somewhat smaller than the bore of a corrugated inner conductor 3 for a coaxial cable, and the assembly is pulled into the hollow inner conductor 3, whereupon the tube 1 is inflated to lock the steel rope 2 to the inner conductor 3.

If the inner conductor 3 for the cable provides resistance to torsional strain, accurate balancing of the steel rope as regards torsional strain may be unnecessary.

When the tube is inflated to lock the rope to the inner conductor, assembly of the coaxial cable is completed by fitting on a corrugated outer conductor 4, and any appropriate insulation, such as indicated fragmentarily in section at 5 in FIG. 1, and/or spacers between the conductors 3 and 4. The steel rope which is secured within and locked to the inner conductor provides the cable with sufficient longitudinal strength to simplify the manufacture of the cable, and to enable the cable to be installed readily on very high masts.

When the cable has been installed, the steel rope may be unlocked from the inner conductor by releasing the pressure inside the tube, and, if necessary, by removing the residual air either by applying vacuum to the tube or by applying gas pressure externally of the tube. The steel rope now lies loosely in the inner conductor and may be readily removed therefrom, provided that the cable run is reasonably straight.

Having now described the invention, what is claimed as new and desired to be secured by Letters Patent is:

1. A method of manufacturing a coaxial cable capable of transmitting frequencies of at least about 100 kilocycles per second, comprising the steps of providing a hollow inner conductor, providing inside the hollow inner conductor a tensile element of substantial strength together with means for temporarily locking the said element to the inner surface of said inner conductor, temporarily locking the said element to the surface of said inner conductor, providing a hollow outer conductor coaxial with said inner conductor, providing at least one electrically insulating member holding said inner and outer conductors in spaced coaxial relationship, thereby to form the finished coaxial cable unlocking said element from the inner surface of the inner conductor, and removing said temporary locking means.

2. The method of claim 1 wherein said locking means is unlocked and removed before installation of the cable.

3. The method of claim 1 wherein said locking means is unlocked and removed after installation of the cable.

4. A method of manufacturing a coaxial cable capable of transmitting frequencies of at least about 100 kilocycles per second, comprising the steps of providing a hollow inner conductor, providing within the hollow inner conductor a steel rope which is approximately balanced as regards torsional strain when tension is applied to it together with an inflatable locking mechanism, inflating said locking mechanism to temporarily lock the steel rope to the inner surface of the inner conductor, providing an outer hollow conductor coaxial with said hollow inner conductor, providing spacing members of electrically insulating material holding said inner and outer conductors in spaced coaxial relationship, deflating said locking mechanism, and removing said locking mechanism and the steel rope from within the hollow inner conductor of the finished coaxial cable.

5. A method of manufacturing a coaxial cable capable of transmitting frequencies of at least about 100 kilocycles per second, comprising the steps of providing a helically corrugated hollow inner conductor, providing within the said inner conductor a tensile element of substantial strength together with an inflatable tube wrapped helically around the tensile element, inflating said tube thereby to temporarily lock the said element to the inner surface of said inner conductor, providing a helically corrugated hollow outer conductor coaxial with said hollow inner conductor, providing at least one spacing member of electrically insulating material holding said inner and outer conductors in spaced coaxial relationship, deflating said helically wrapped tube, and withdrawing the tensile element and helically wrapped tube from the finished coaxial cable.

6. A method of manufacturing a coaxial cable capable of transmitting frequencies of at least about 100 kilocycles per second, comprising the steps of providing a helically corrugated hollow inner conductor, inserting inside the hollow inner conductor a tensile element of substantial strength which comprises sprung projections lying at an angle to the axis of the tensile element in a direction such that the sprung projections ride under the helical corrugations of the inner conductor, moving said tensile element when within the hollow inner conductor in the opposite direction so as to cause said sprung projections to engage against the helical corrugations of the inner conductor, thereby temporarily locking the tensile element to the inner surface of the inner conductor, providing a hollow outer conductor for the cable, providing at least one member of electrically insulating material holding the inner and outer conductors in spaced coaxial relationship, moving said tensile element in said first mentioned direction, and removing it from the finished coaxial cable.

7. A coaxial cable capable of transmitting frequencies of at least about 100 kilocycles per second, comprising a hollow inner conductor in the form of a thin walled tube having helical corrugations, a hollow outer conductor, at least one member of electrically insulating material holding the inner and outer conductors in spaced coaxial relationship, a tensile element of substantial strength within the inner hollow conductor, and locking means located between the tensile element and the interior of the inner hollow conductor, temporarily locking the tensile element to the interior hollow conductor.

8. The coaxial cable of claim 7 wherein said locking means is an inflatable tube surrounding the tensile element.

References Cited in the file of this patent
UNITED STATES PATENTS 2,809,664    Vollmar _____ Oct. 15, 1957

FOREIGN PATENTS 716,618    Great Britain _____ Oct. 13, 1954
932,619    Germany _____ Sept. 5, 1955